US008862709B2

(12) United States Patent
Cromer et al.

(10) Patent No.: US 8,862,709 B2
(45) Date of Patent: Oct. 14, 2014

(54) REMOTE MANAGEMENT OF BOOT APPLICATION

(75) Inventors: Daryl Carvis Cromer, Apex, NC (US); Richard Alan Dayan, Raleigh, NC (US); Joseph Wayne Freeman, Raleigh, NC (US); Steven Dale Goodman, Raleigh, NC (US); Eric Richard Kern, Durham, NC (US); Howard Jeffrey Locker, Cary, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/955,886

(22) Filed: Dec. 13, 2007

(65) Prior Publication Data

US 2008/0155075 A1    Jun. 26, 2008

Related U.S. Application Data

(62) Division of application No. 10/749,583, filed on Dec. 31, 2003, now Pat. No. 8,677,117.

(51) Int. Cl.
| G06F 9/44 | (2006.01) |
| H04L 29/08 | (2006.01) |
| H04L 29/12 | (2006.01) |
| G06F 15/177 | (2006.01) |
| H04N 21/443 | (2011.01) |

(52) U.S. Cl.
CPC ............ *G06F 9/4416* (2013.01); *G06F 9/4406* (2013.01); *H04L 67/34* (2013.01); *H04L 29/12235* (2013.01); *G06F 15/177* (2013.01); *H04N 21/443* (2013.01); *G06F 9/4408* (2013.01); *G06F 9/4401* (2013.01)
USPC ......................................................... 709/222

(58) Field of Classification Search
CPC ... G06F 15/177; G06F 9/4416; G06F 9/4408; G06F 9/4406; G06F 9/4401; H04N 21/443; H04N 67/34; H04N 29/12235
USPC ......................................................... 709/222
See application file for complete search history.

(56) References Cited

U.S. PATENT DOCUMENTS 4,663,707 A * 5/1987 Dawson ............................ 713/2
5,577,210 A * 11/1996 Abdous et al. ................. 709/219
(Continued)

OTHER PUBLICATIONS

Symantec corporation, "Symantec Ghost Implementation Guide", Copyright 1998-2003.*

(Continued)

*Primary Examiner* — O. C. Vostal
(74) *Attorney, Agent, or Firm* — Thomas E. Tyson; Schubert Law Group PLLC (57) ABSTRACT

Systems and arrangements for remotely selecting a bootable image via a WOL packet for a wake-on-LAN (WOL) capable computer are contemplated. Server-side embodiments include hardware and/or software for determining a client to be managed, determining whether the client is active on the network, and transmitting a WOL packet having a vector, or operating system partition identification (OSPID), to describe a bootable image accessible by the WOL capable computer. Some embodiments may include an OSPID that points to a secure bootable image such as a bootable image on a hard drive, a compact disk (CD) connected to the computer, or other local resource. Client-side embodiments may receive the WOL packet at, for instance, a network interface card (NIC), recognize that the WOL packet includes an OSPID that describes the bootable image to boot, and implement an alternative boot sequence to boot from that bootable image.

18 Claims, 9 Drawing Sheets

(56) References Cited

U.S. PATENT DOCUMENTS

| | | | | |
|---|---|---|---|---|
| 5,826,015 | A | * | 10/1998 | Schmidt .......................... 726/23 |
| 5,978,918 | A | * | 11/1999 | Scholnick et al. .............. 726/10 |
| 6,101,608 | A | | 8/2000 | Schmidt et al. |
| 6,105,136 | A | | 8/2000 | Cromer et al. |
| 6,158,020 | A | | 12/2000 | Locker et al. |
| 6,218,941 | B1 | * | 4/2001 | Cromer et al. ............. 340/572.1 |
| 6,249,812 | B1 | | 6/2001 | Cromer et al. |
| 6,263,373 | B1 | | 7/2001 | Cromer et al. |
| 6,282,642 | B1 | * | 8/2001 | Cromer et al. ..................... 713/2 |
| 6,311,276 | B1 | | 10/2001 | Connery et al. |
| 6,317,826 | B1 | | 11/2001 | McCall et al. |
| 6,334,149 | B1 | | 12/2001 | Davis et al. |
| 6,339,792 | B1 | * | 1/2002 | Allison et al. ................ 709/228 |
| 6,366,957 | B1 | * | 4/2002 | Na .............................. 709/229 |
| 6,405,259 | B1 | * | 6/2002 | Cheston et al. ............... 709/245 |
| 6,421,777 | B1 | * | 7/2002 | Pierre-Louis et al. ............ 713/2 |
| 6,421,782 | B1 | | 7/2002 | Yanagisawa et al. |
| 6,438,640 | B1 | | 8/2002 | Miyamoto et al. |
| 6,473,857 | B1 | * | 10/2002 | Panas et al. ....................... 713/2 |
| 6,490,722 | B1 | * | 12/2002 | Barton et al. ................. 717/174 |
| 6,523,111 | B1 | * | 2/2003 | Smolski .............................. 713/2 |
| 6,526,507 | B1 | | 2/2003 | Cromer et al. |
| 6,606,709 | B1 | * | 8/2003 | Connery et al. ................ 726/14 |
| 6,631,468 | B1 | * | 10/2003 | von Below ........................ 713/2 |
| 6,658,563 | B1 | | 12/2003 | Ice et al. |
| 6,684,326 | B1 | | 1/2004 | Cromer et al. |
| 6,691,160 | B1 | * | 2/2004 | Bradley ........................ 709/222 |
| 6,701,442 | B1 | | 3/2004 | Kunz et al. |
| 6,742,028 | B1 | | 5/2004 | Wang et al. |
| 6,760,850 | B1 | * | 7/2004 | Atkinson et al. .............. 713/320 |
| 6,779,109 | B2 | | 8/2004 | Stevens |
| 6,816,964 | B1 | * | 11/2004 | Suzuki et al. ..................... 713/2 |
| 6,944,653 | B2 | | 9/2005 | Fong et al. |
| 6,976,058 | B1 | | 12/2005 | Brown et al. |
| 7,007,300 | B1 | * | 2/2006 | Weber et al. .................... 726/21 |
| 7,054,937 | B1 | * | 5/2006 | Milne et al. ................... 709/227 |
| 7,069,431 | B2 | | 6/2006 | Dayan et al. |
| 7,085,921 | B2 | * | 8/2006 | Frye, Jr. ............................ 713/1 |
| 7,093,124 | B2 | * | 8/2006 | Girard ........................... 713/164 |
| 7,480,265 | B2 | | 1/2009 | Cromer et al. |
| 7,483,966 | B2 | | 1/2009 | Cromer et al. |
| 7,657,615 | B1 | * | 2/2010 | Patterson et al. ............. 709/221 |
| 7,882,343 | B2 | * | 2/2011 | Fontijn .............................. 713/2 |
| 2002/0124245 | A1 | | 9/2002 | Maddux et al. ............... 717/176 |
| 2002/0188837 | A1 | * | 12/2002 | Dayan et al. ...................... 713/2 |
| 2003/0005096 | A1 | * | 1/2003 | Paul et al. ..................... 709/222 |
| 2003/0005276 | A1 | * | 1/2003 | French et al. ..................... 713/2 |
| 2003/0009657 | A1 | * | 1/2003 | French et al. ..................... 713/2 |
| 2003/0028800 | A1 | * | 2/2003 | Dayan et al. .................. 713/200 |
| 2003/0046529 | A1 | * | 3/2003 | Loison et al. ..................... 713/2 |
| 2003/0055919 | A1 | | 3/2003 | Fong et al. |
| 2003/0058843 | A1 | | 3/2003 | Nishikawa |
| 2003/0069951 | A1 | * | 4/2003 | Fong et al. .................... 709/222 |
| 2003/0084133 | A1 | | 5/2003 | Chan et al. |
| 2003/0084337 | A1 | * | 5/2003 | Simionescu et al. .......... 713/200 |
| 2003/0097398 | A1 | | 5/2003 | Knox et al. |
| 2003/0126242 | A1 | * | 7/2003 | Chang ........................... 709/222 |
| 2004/0030883 | A1 | * | 2/2004 | Munguia et al. .............. 713/100 |
| 2004/0103177 | A1 | * | 5/2004 | Ben Ismail et al. ........... 709/222 |
| 2004/0107016 | A1 | * | 6/2004 | Geeng ............................. 700/94 |
| 2004/0141461 | A1 | * | 7/2004 | Zimmer et al. ................ 370/216 |
| 2004/0163008 | A1 | * | 8/2004 | Kim ................................. 714/4 |
| 2004/0193867 | A1 | | 9/2004 | Zimmer et al. |
| 2004/0213289 | A1 | | 10/2004 | Liu et al. |
| 2004/0221024 | A1 | * | 11/2004 | Yamada et al. ................ 709/222 |
| 2004/0254978 | A1 | | 12/2004 | Ibanez et al. |
| 2004/0255172 | A1 | * | 12/2004 | Dayan et al. ................... 713/300 |
| 2004/0267926 | A1 | * | 12/2004 | Rothman et al. .............. 709/224 |
| 2004/0268111 | A1 | * | 12/2004 | Dayan et al. ...................... 713/2 |
| 2005/0050577 | A1 | * | 3/2005 | Westbrook et al. ............ 725/134 |
| 2005/0097372 | A1 | * | 5/2005 | Ortiz et al. .................... 713/300 |
| 2005/0144493 | A1 | * | 6/2005 | Cromer et al. ................ 713/310 |
| 2005/0154928 | A1 | | 7/2005 | Larson et al. |
| 2005/0166213 | A1 | | 7/2005 | Cromer et al. |
| 2006/0036877 | A1 | | 2/2006 | Anderson et al. |
| 2006/0041745 | A1 | * | 2/2006 | Parnes .......................... 713/163 |

OTHER PUBLICATIONS

Henry, "PXE Manageability Technology for EFI", 2000.*
Bootix Technology GmbH, "BootManage TFTP Server User and Reference Manual", 2000.*
Bootix Technology GmbH, "BootManage TCP/IP BOOT-PROM User and Reference Manual", 2001.*
Moore et al., "Managing Mixed-Use Clusters with CLuster-on-Demand", 2003.*
Intel Corporation, "Preboot Execution Environment (PXE) Specification Version 2.1", 1999.*
Microsoft, "Microsoft Computer Dictionary Fifth Edition", 2002, pp. 317 and 440.*
"Secure Authentication for Remote Client Management," Mar. 1999; IBM TDB-ACC-NO NNRD41993, vol. 42, Issue 419, Cross Reference 0374-4353-42-419-0.
American National Standards Institute, Inc., "Protected Area Run Time Interface Extensions Services (Parties)."; Mar. 13, 2001, 35 pages [Copyright Notice].
Brown, Christopher L.T., "Analysis of the ATA Protected Area Technical White Paper," Copyright 2002, Jul. 17, 2003, Technology Pathways, 3 pages; Retrieved from http://www.techpathways.com/uploads/ProtectedAreaAnalysis.pdf.
Gupta, Mayank R., et al., "Hidden Disk Areas: HPA and DCO," Fall 2006; International Journal of Digital Evidence, vol. 5, Issue 1, 8 pages; Retrieved from http://www.utica.edu/academic/institutes/ecii/publications/articles/EFE36584-D13F-2962-67BEB146864A2671.pdf.
"IBM® Hidden Protected Area, Access ICM Predesktop Area," Jan. 24, 2003; IBM Corporation, 13 pgs.

* cited by examiner

REMOTE MANAGEMENT OF BOOT APPLICATION

CROSS-REFERENCE TO RELATED APPLICATION

This application is a divisional application of U.S. patent application Ser. No. 10/749,583, entitled "REMOTE MANAGEMENT OF BOOT APPLICATION", filed Dec. 31, 2003, the disclosure of which is incorporated herein in its entirety for all purposes.

FIELD OF INVENTION

The present invention is in the field of data processing systems and, in particular, a data processing system and method for remote management of boot applications for the data processing system.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

One known method for managing a networked system is the ability of a computer system to cause a currently powered-off client computer system on the network to power-up. This method is commonly called "Wake-on-LAN" (WOL), and may also be known as remote wake-up. This method permits a server, or any other computer system on the network, to cause a client on the network to power-up by transmitting a WOL (or magic) packet with the appropriate information.

By utilizing WOL, system administrators can more efficiently manage a client-server system by performing automated services such as software downloads, upgrades, maintenance, back-ups, virus scans, etc. during times when end-users are gone and when off-peak loads exist on the network. WOL provides more efficiency for end-users as software maintenance and operations can be performed while they are gone, eliminating delays and reboots. Systems administrators save time with WOL as well by avoiding having to manually turn computers on and off to perform software maintenance, upgrades, etc. Network operations are also improved as bandwidth-hungry applications such as upgrades can be performed when network activity is at a minimum. Network administrators could keep a little used computer in a powered-down state in a remote location, and could use WOL to wake it when needed.

In order to utilize WOL, a server transmits a WOL packet to a computer over a network. The WOL packet is a data packet that contains information identifying it as a WOL command, as well as authentication information. When a computer equipped with WOL functionality receives the WOL packet, it will attempt to turn on. One problem currently encountered by the administrator is that if a remote agent is not active on the computer, the computer will boot from a default bootable image or the last bootable image selected by the user. A bootable image is the operating system or similar application designed to interface with a user directly or via one or more higher-level applications to provide functionality to the user. Thus, someone such as the administrator must manually intervene, or physically go to the location of the computer and interface with the computer to modify the booting sequence, and cause the computer to boot from the desired bootable image.

As an illustration, the administrator may want to run a maintenance diagnostic routine on a logically partitioned system and the maintenance diagnostics may reside in a particular partition dedicated for maintenance. If the remote client is not active when the administrator transmits a WOL packet, the computer boots via a bootable image other than the maintenance partition. The administrator must then physically go to the computer, negating the benefits of remote maintenance capabilities, and change the booting sequence to boot from the maintenance partition or to turn on the remote client.

Further, if the computer does not turn on as a result of a software problem with the currently selected bootable image, the administrator must manually intervene to perform maintenance diagnostics even though the computer may contain diagnostics and repair software to repair the software problem.

Inefficiencies resulting from an inability to remotely select a bootable image are exacerbated when a server must manage a large number of clients. Manual intervention significantly detracts from the efficiency of the administrator for each affected computer. If, for example, an administrator must install an operating system upgrade in fifty computers during the night, and twenty of the computers are set to an incompatible bootable image, time is wasted physically going to or having someone else physically go to the computers to turn them on and either reconfigure the computers to allow remote maintenance or initiate the maintenance locally. Moreover, greater knowledge and control of the client computer systems could allow the server to optimize management of the clients and networks.

SUMMARY OF THE INVENTION

The problems identified above are in large part addressed by systems and arrangements for remotely selecting a bootable image for a client. One embodiment provides a method for booting via a selected bootable image on a remote client on a network. The method generally comprises selecting the bootable image for the remote client; generating a wake-on-LAN packet with a partition identification, the partition identification being associated with a location of the bootable image, wherein the location is accessible by the remote client; and transmitting the wake-on-LAN packet to the remote client to wake up the remote client and to instruct a pre-boot application of the remote client to boot via the bootable image.

Another embodiment provides a service for booting via a selected bootable image on a remote client on a network. The service may include selecting the bootable image for the remote client; generating a wake-on-LAN packet with a partition identification, the partition identification being associated with a location of the bootable image, wherein the location is accessible by the remote client; and transmitting the wake-on-LAN packet to the remote client to wake up the remote client and to instruct a pre-boot application of the remote client to boot via the bootable image.

Yet another embodiment provides a data processing system for booting via a selected bootable image on a remote client on a network, the system comprising a server computer system in communication with at least one client computer system, the server computer system comprising a processor capable of selecting the bootable image for the remote client; wherein the server computer system is capable of generating a wake-on-LAN packet with a partition identification, the partition identification being associated with a location of the bootable image, wherein the location is accessible by the remote client; wherein the server computer system is capable of transmitting the wake-on-LAN packet to the remote client to wake up the remote client and to instruct a pre-boot application of the remote client to boot via the bootable image; and a database, the database comprising an indication of one or more clients and the status of their wake-on-LAN functionality.

A further embodiment provides a machine-accessible medium containing instructions, which when executed by a machine, cause said machine to perform operations. The operations can involve selecting a bootable image for a remote client; generating a wake-on-LAN packet with a partition identification, the partition identification being associated with a location of the bootable image, wherein the location is accessible by the remote client; and transmitting the wake-on-LAN packet to the remote client to wake up the remote client and to instruct a pre-boot application of the remote client to boot via the bootable image.

One embodiment provides a computer-readable medium containing a data structure for use by a data processing system on a network. The data structure generally comprises an indication of an address of a server computer system; an indication of an address for a client computer system; a synchronization stream; and an indication of a bootable image accessible by the client computer system to instruct the a pre-boot application of the client computer system to boot via the bootable image.

Another embodiment provides an apparatus for booting via a bootable image selected by a remote server on a network. The apparatus generally includes a packet parser to identify a partition identification associated with the bootable image in a wake-on-LAN packet, the partition identification being associated with a location of the bootable image; and partition identification logic coupled with the packet parser to store the partition identification in a memory location, the memory location to maintain the partition identification to instruct the boot manager to boot via the bootable image.

One embodiment provides a method for booting via a bootable image selected by a remote server on a network. The method generally involves identifying a partition identification associated with the bootable image in a wake-on-LAN packet, the partition identification being associated with a location of the bootable image; storing the partition identification in a memory location, the memory location to maintain the partition identification to instruct the boot manager to boot via the bootable image; scanning the memory location to determine the presence of the partition identification; and booting via the bootable image in response to the presence of the partition identification.

A further embodiment provides a machine-accessible medium containing instructions, which when executed by a machine, cause said machine to perform operations. The operations can involve identifying a partition identification associated with a bootable image in a wake-on-LAN packet, the partition identification being associated with a location of the bootable image; storing the partition identification in a memory location, the memory location to maintain the partition identification to instruct the boot manager to boot via the bootable image; scanning the memory location to determine the presence of the partition identification; and booting via the bootable image in response to the presence of the partition identification.

BRIEF DESCRIPTION OF THE DRAWINGS

Other purposes and advantages of the invention will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems and arrangements for remotely selecting a bootable image via a WOL packet for a wake-on-LAN (WOL) capable computer are disclosed.

Server-side embodiments include hardware and/or software for determining a client to be managed, determining whether the client is active on the network, and transmitting a WOL packet having a vector, or operating system partition identification (OSPID), to describe a bootable image accessible by the WOL capable computer. Some embodiments may include an OSPID that points to a secure bootable image such as a bootable image on a hard drive, internal to the WOL capable computer, on a compact disk (CD) connected to the computer, or other local resource. Further embodiments may include an OSPID to describe a secure bootable image and a higher-level application to initiate. For instance, the OSPID may point to a bootable image in the protected area run time interface extension services (PARTIES) partition, or other hidden partition, and pass a parameter to the bootable image to initiate a software application on a maintenance server. PARTIES is a generic term for a host-protected area defined by the ATA/ATAPI standards. A PARTIES partition includes space for, e.g., vendor-unique applications at the top of the hard file, away from the boot sector, that are not necessarily accessible, or even visible, by the operating system. Advantageously, these embodiments can boot from the secure bootable image, internal to the WOL capable computer, and the bootable image may include software to determine the trustworthiness of the software application on the maintenance server prior to executing the software application. Including the software to determine the trustworthiness in the bootable image also allows less expensive memory to be used than, for instance, flash memory when including the software in BIOS.

Client-side embodiments may receive the WOL packet at, for instance, a network interface card (NIC), recognize that the WOL packet includes an OSPID that describes the bootable image to boot, and implement an alternative boot sequence to boot from that bootable image. Some embodiments will delete the OSPID after the first boot to avoid, mistakenly, reusing the OSPID to select the bootable image in a subsequent boot. Further embodiments include a setting to prevent the OSPID from being deleted, making the bootable image a permanent selection.

Figure 1:
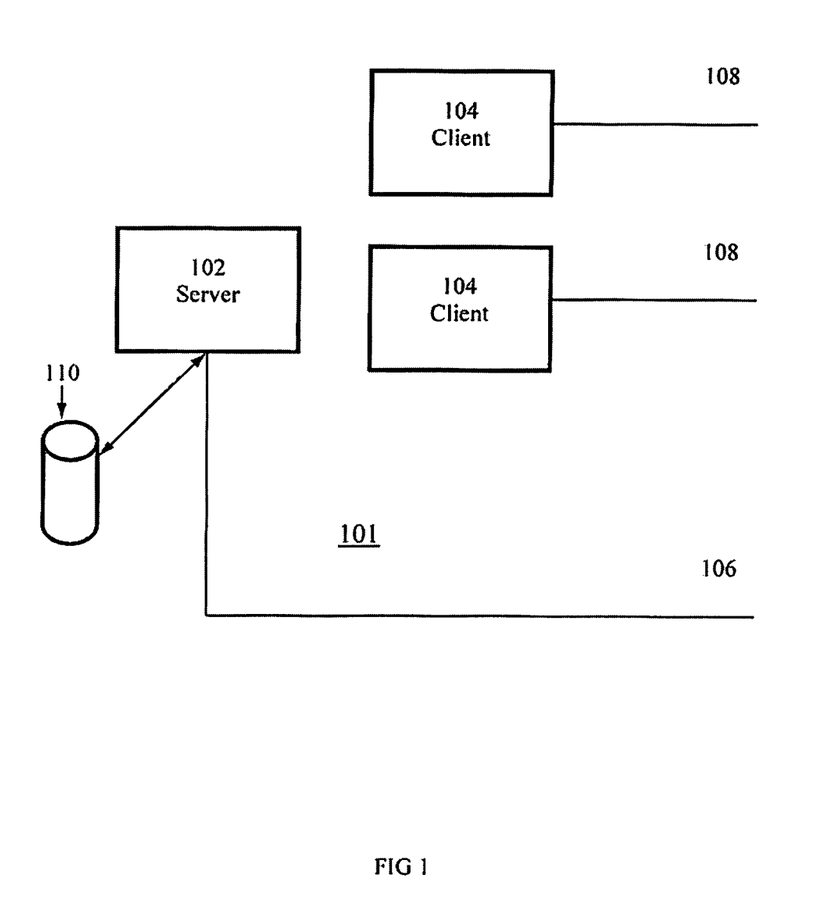
FIG. 1 depicts an environment for a system for remote selection of a bootable image for a client computer by a server computer according to one embodiment.

Turning now to the drawings, FIG. 1 depicts one embodiment of a data processing system 101 for remotely selecting a bootable image via a wake-on-LAN (WOL) packet for a WOL capable computer. System 101 includes a server computer system 102 ("server") coupled to one or more remote client computer systems 104 ("clients"). The clients may be equipped with Wake-on-LAN ("WOL") capability, which provides them with the ability to be "Woken up" while in a low-power state and returned to a full power state, and to boot a bootable image identified by a operating system partition identification (OSPID) when a WOL-equipped network interface card (NIC) receives the appropriate WOL command with the OSPID. WOL is also sometimes known as remote wake-up or MAGIC PACKET™ technology. In system 101, the server 102 and client 104 may be located at the same location, such as in the same building or computer lab, or could be geographically separated. While the term "remote" is used with reference to the distance between the server 102 and client 104, the term is used in the sense of indicating separation of some sort, rather than in the sense of indicating a large physical distance between the systems. In fact, the server 102 and client 104 may be physically adjacent in some network arrangements.

System 101 may also include a WOL database server 110 in communication with server 102. WOL database server 110 may comprise indications relating to one or more clients 104, as described in more detail in relation to FIG. 8. In one embodiment, WOL database server 110 stores an indication relating to whether a particular client 104 has WOL enabled of disabled.

In one embodiment, server 102 is connected to a hub (not shown) utilizing a local area network (LAN) connector bus 106. In this embodiment, one of more clients 104 also connect to the hub through respective LAN busses 108. The network conforms to the Ethernet specification and uses such hubs. It will be appreciated, however, that other forms of networks, such as token ring, may be utilized to implement the invention.

The server 102 and one or more clients 104 are therefore associated one with the Other through some form of LAN or the like, in which effective communication may be established through electrically conductive connections, through fiber optical links, through infrared or other radiation links, or in other manners. A "network" may include any type of data communications channel, such as an Ethernet network, token ring, X.10, X.25, etc. Those skilled in the art will recognize that the invention described herein may be implemented utilizing any type of data communications channel.

Figure 2:
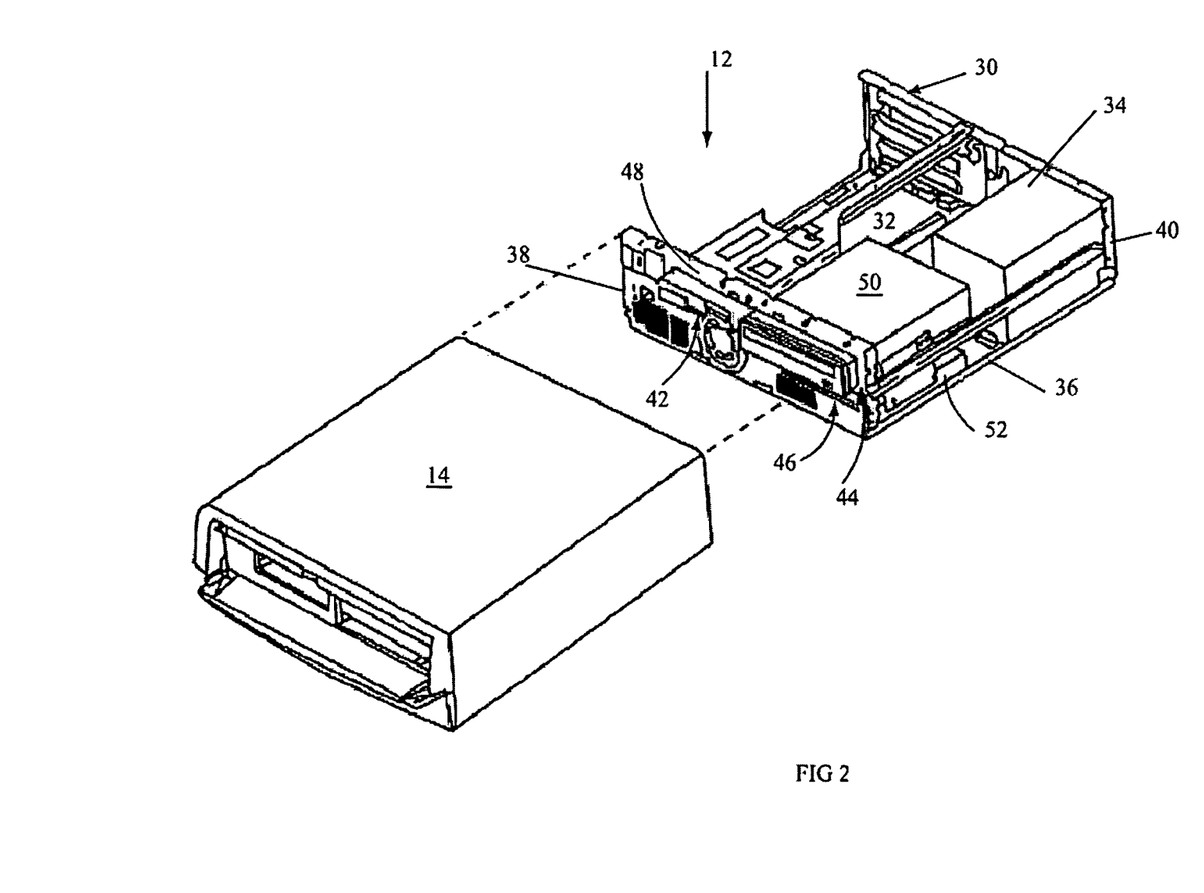
FIG. 2 depicts an exploded perspective view of certain elements of a personal computer according to one embodiment, including a chassis, a cover, and a planar board.
Figure 3:
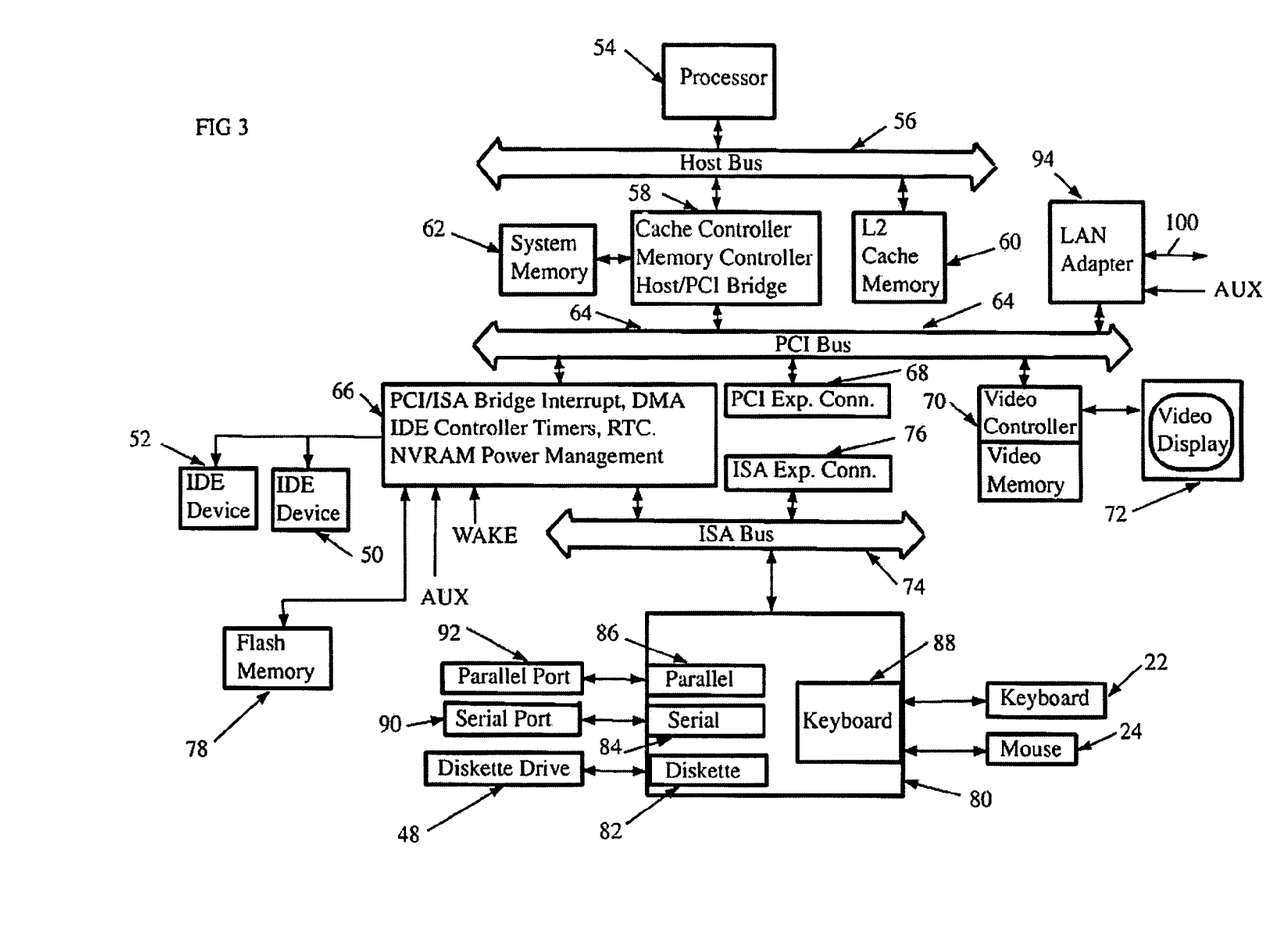
FIG. 3 depicts a block diagram of certain components of the personal computer of FIG. 2.

FIGS. 2 and 3 depict one embodiment of a personal computer 12 suitable for use as, for example, a client 104. In one embodiment, server 102 may also be a personal computer 12. Alternatively, the server 102 may be some computer having capabilities other than those ascribed herein to a "personal computer", and possibly beyond those capabilities.

As shown in FIG. 2, personal computer 12 comprises a cover 14 which is a decorative outer member which cooperates with a chassis 30 in defining an enclosed, shielded volume for receiving electrically powered data processing and storage components for processing and storing digital data. At least certain of these components are mounted on a multilayer planar 32 or motherboard which is mounted on the chassis 30 and provides a means for electrically interconnecting the components of the personal computer 12 including those identified above and such other associated elements as floppy disk drives, various forms of direct access storage devices, accessory adapter cards or boards, and the like. As pointed out more fully hereinafter, provisions are made in the planar 32 for the passage of input/output signals to and from the operating components of the personal computer 12.

Personal computer 12 has a power supply 34, which may be actuated by a power switch (not shown). The chassis 30 has a base indicated at 36, a front panel indicated at 38, and a rear panel indicated at 40. The front panel 38 defines at least one open bay for receiving a data storage device such as a disk drive for magnetic or optical disks, a tape backup drive, or the like. In the illustrated form, a pair of upper bays 42, 44 and a lower bay 46 are provided. One of the upper bays 42 is adapted to receive peripheral drives of a first size (such as those known as 3.5 inch drives) while the other 44 is adapted to receive drives of a different size (such as a CD-ROM or DVD-ROM drive) and the lower bay is adapted to receive another drive. One floppy disk drive indicated at 48 is a removable medium direct access storage device (DASD) capable of receiving a diskette inserted there into and using the diskette to receive, store and deliver data as is generally known. One CD-ROM drive indicated at 50 is a removable medium DASD capable of receiving a compact disc inserted there into and using the disc to deliver data as is generally known. One hard disk drive is indicated at 52 and is a fixed medium DASD capable of storing and delivering data as is generally known.

Referring now to FIG. 3, there is shown a block diagram of a client computer system illustrating the various components of the personal computer of FIG. 2. The components of FIG.

3 comprise components mounted on the planar 32 or other hardware of the personal computer 12. Connected to the planar 32 is the system CPU or processor 54 which is connected directly to a high speed host bus 56. A first system core logic chipset 58 and L2 cache memory 60 are also connected to the host bus 56. The first core logic chipset 58 includes a memory control unit, a L2 cache controller and a peripheral component interconnect (PCI) bridge. The memory control unit is further connected to a volatile random access memory (RAM) 62. The RAM memory 62 is composed of one of more memory modules. The memory control unit, or memory controller, includes the logic for mapping addresses to and from the microprocessor 54 to particular areas of RAM 62. The cache controller is operatively coupled to the L2 cache memory 60.

The first core chipset 58 can be, for example, a Triton VX chip which is sold by Intel Corporation. The PCI bridge within chipset 58 provides an interface between the host bus 56 and a PCI bus 64. Connected to the PCI bus 64 is a second core chipset 66 and a plurality of PCI expansion connectors 68 for receiving PCI bus compatible peripheral cards. One such peripheral card is a video controller 70. The video controller 70 includes video memory and is coupled to the monitor or video display terminal 72. The chipset 66 can be, for example, a PIIX4 chip which is also sold by Intel Corporation.

The chipset 66 contains a bus control and timing unit, a plurality of timers, an interrupt controller, a direct memory, access (DMA) unit, nonvolatile CMOS RAM (also herein referred to as NVRAM), a CMOS real-time clock (RTC), Flash memory interface, a PCI/ISA bridge, an integrated drive electronics (IDE) controller, and power management circuitry. The PCI/ISA bridge provides an interface between the PCI bus 64 and an optional feature or expansion bus such as the Industry Standard Architecture (ISA) bus 74. Connected to the ISA bus 74 are a plurality of ISA expansion connectors 76 for receiving ISA adapter cards (not shown). ISA adapter cards can be pluggably connected to the ISA expansion connectors 76 and may provide additional devices or memory for the personal computer 12.

Attached to the chipset 66 is a flash memory (FM) module or chip 78. Flash memory module 78 contains microcode that personal computer 12 will execute on power on. The flash memory 78 is an electrically erasable programmable read only memory (EEPROM) module or chip. The IDE controller provides for the attachment of IDE compatible storage devices such as the fixed disk drive 52 and CD-ROM drive 50.

The real-time clock is used for time of day calculations and the NVRAM is used to store system configuration data. That is, the NVRAM will contain values that describe the present configuration of the personal computer 12. For example, NVRAM 66 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Power management logic within chipset 66 is for changing the personal computer 12 between various power states (e.g., off, suspend and normal operating states). The circuitry is supplied with auxiliary power (AUX) from the power supply 34 (as shown in FIG. 2) when the personal computer 12 is in the off state so that it can monitor events that cause the personal computer 12 to turn on. For example, the circuitry 66 also includes a timer that is configurable by a user to expire after a predetermined period of time, often referred to a time to power on function. When the timer expires, the circuitry 66 such as a service processor will cause the personal computer 12 to change from the off state to the normal operating state.

Coupled to the ISA bus 74 is a multi-function I/O controller 80 such as, for example, a National Semiconductor PC87307. The I/O controller 80 contains a variety of I/O adapters and other components such as the diskette adapter 82, serial adapter 84, a parallel adapter 86 and keyboard controller 88. The diskette adapter 82 provides the interface to the diskette drive 48. The serial adapter 84 has an external port connector 90 for attachment of external devices such as modems (not shown). The parallel adapter 86 has an external port connector 92 for attachment of external devices such as printers (not shown). The keyboard controller 88 is the interface for the keyboard connector 22 and the mouse connector 24.

A communication subsystem 94 can be coupled to either the PCI bus 64 or ISA bus 74 for allowing personal computer 12 to communicate (i.e., transmit/receive data) with a remote computer or server over a LAN via a connection or link 100. The communication subsystem 94 can be, for example, a LAN adapter or a LAN connection embedded on the planar 32. Communication subsystem 94 may also be known as a network interface card (NIC). Communication subsystem 94 may include a Media Access Controller (MAC), which serves as an interface between a shared data path (e.g., a media independent interface as described below) and the PCI bus 64 (or ISA bus 74 if communication subsystem 94 were connected to the ISA bus 74). The MAC performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception. The MAC can be, for example, an Intel 82557 chip.

The communication subsystem 94 further comprises a physical layer and a media independent interface (MII), which is a local bus between the MAC and the physical layer. The MII is a specification of signals and protocols which formalizes the interfacing of a 10/100 Mbps Ethernet MAC, for example, to the underlying physical layer. The physical layer receives parallel data from the MII local bus and converts it to serial data for transmission over cable 100. The physical layer may be, for example, an Integrated Circuits Systems 1890 chip. The physical layer includes auto-negotiation logic that, in one embodiment, determines the capabilities of the server 102, advertises its own capabilities to the server 102, and establishes a connection with the server 102 using the highest performance common connection technology.

When the communication subsystem 94 is in WOL mode (e.g., when the client 104 is asleep), communication subsystem 94 scans all incoming frames addressed to client 104 for a specific data sequence which indicates that the frame is a WOL or MAGIC PACKET™ frame. WOL packets and frames are described in more detail in relation to FIGS. 5A and 5B. If the communication subsystem 94 scans a frame and does not find the appropriate WOL sequence, it discards the frame and takes no further action. If it detects the WOL sequence, however, it then alerts the power management circuitry 66 to wake up or power on the system.

Further, if communication subsystem 94 also recognizes the inclusion of an OSPID that describes a bootable image to boot the system from, communication subsystem 94 may implement an alternative boot sequence to boot that bootable image. For example, communication subsystem 94 receives a WOL packet and verifies that the packet is authentic by, for instance, decrypting the packet with a private key. Upon identifying the wake up sequence, communication subsystem 94 recognizes an extension on the WOL packet (the OSPID) that is an indicator for a bootable image of a maintenance application in the PARTIES partition of a local hard drive. Communication subsystem 94 stores the OSPID in non-volatile memory of the system such as in a pre-selected location of NVRAM 66. Then power-on self test (POST) looks to the pre-selected location of NVRAM 66 to determine the presence of the OSPID therein. POST is a diagnostic testing sequence run by a computer's BIOS as the computer's power is initially turned on. POST will determine if the computer's RAM, disk drives, peripheral devices and other hardware components are properly working. If the diagnostic determines that everything is in working order, the computer will continue to boot. In response to identifying the OSPID, however, POST instructs BIOS to boot the maintenance application associated with the OSPID rather than boot from the normal boot sector. The maintenance application may then perform maintenance on the WOL capable computer. And, advantageously, this may occur in the middle of the night, halfway around the world, when no one is likely scheduled to need to use the WOL capable computer.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. As one example, the system processor 54 could be an Intel Pentium processor, Cyrix 586-P75 processor or Advanced Micro Devices 8486 processor or any other suitable microprocessor.

Figure 4:
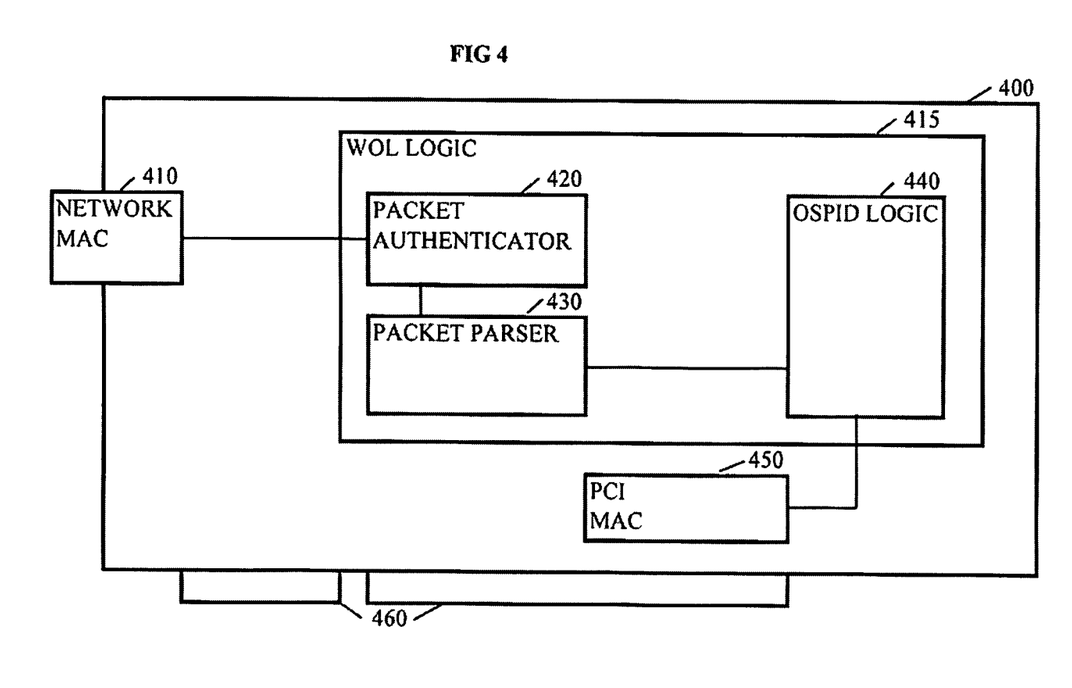
FIG. 4 depicts an embodiment of a network interface card, as an example of an interface for a communication subsystem in FIG. 3, to determine the presence of the operating system partition identification (OSPID) in a data packet as part of or as an extension for a WOL packet.

FIG. 4 depicts an embodiment of a network interface card (NIC) 400, as an example of an interface for communication subsystem 94 in FIG. 3, to determine the presence of and act upon the OSPID in a WOL packet. More specifically, NIC 400 may receive a packet such as the data packet 500 depicted in FIG. 5A. The data packet may include a WOL packet having an OSPID to wake up personal computer 12 and boot personal computer 12 from a bootable image described by the OSPID. NIC 400 includes a network MAC 410, a WOL logic 415, a PCI MAC 450, and connectors 460 to communicatively couple NIC 400 with PCI bus 64. Network MAC 410 may selectively receive data packets addressed for NIC 400.

WOL logic 415 may authenticate/and interpret the received package to determine whether the packet includes an OSPID. In particular, packet authenticator 420 may decrypt the data included with the data packet with, e.g., a private key, to authenticate the trustworthiness of the source of the data packet. Upon authenticating the data packet, packet parser 430 determines the presence of the WOL packet to boot personal computer 12 and the presence of the OSPID to select a bootable image, OSPID logic 440 may store the OSPID in non-volatile memory accessible to POST, another pre-boot application, of other pre-boot logic. POST will then direct the boot manager to boot the boot image that is identified by the OSPID.

Figure 5A:
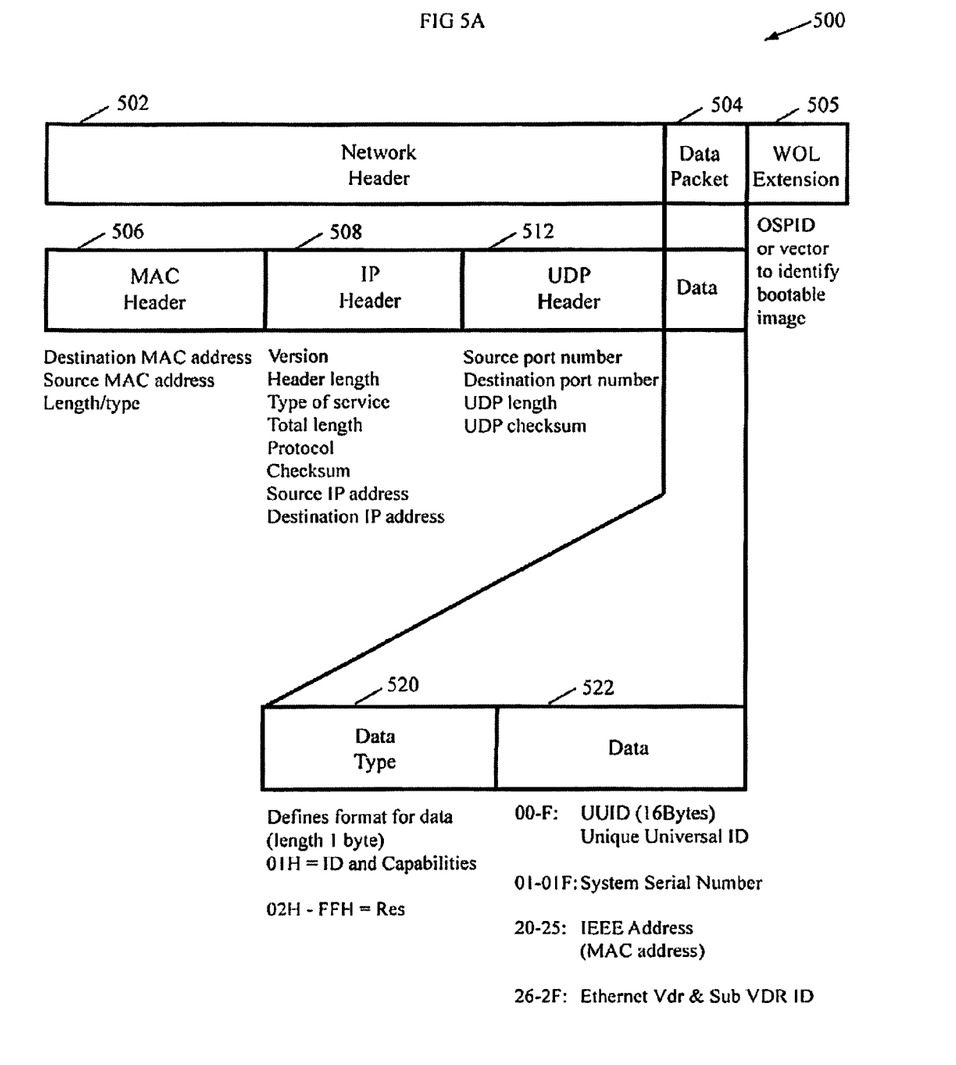
FIG. 5A depicts a diagrammatic representation of a network packet that is sent to a personal computer according to one embodiment.

FIG. 5A depicts a diagrammatic representation of a network packet that is sent by a personal computer 12 of server 102 according to one embodiment. The network packet 500 comprises a network header 502, a data packet 504, and a WOL extension 505 that can be sent over a network, such as an Ethernet network. Network header 502 includes a MAC header 506, IP header 508, and UDP header 512 which are all known in the art to provide addresses, identifiers, and other information for assuring correct transfer of the packet 500. Data packet 504 includes the information content to be transferred.

The data packet 504 includes a data type 520 which is first used to set up a category of data and a data portion 522, which provides specific information. The data type 520 indicates a transmission of system identification and capabilities. The data patterns defined are the (1) Universal Unique ID (UUID) which is used by server 102 to reference personal computer 12, (2) serial number of personal computer 12 which is used by server 102 to determine the model of personal computer 12; (3) IEEE Address which is assigned by IEEE to uniquely identify personal computer 12 on a network, and (4) Ethernet Vendor which identifies the vendor of the communication (Ethernet LAN) subsystem 94 in personal computer 12 used by the server 102 to select the correct device driver. It should be understood that the data packet 504 and data patterns shown in FIG. 5 are by way of example only, and other packets and patterns can be used with the present invention.

The WOL extension 505 is an extension designed to identify a selected bootable image to boot personal computer 122. The bootable image may be selected by an administrator to perform maintenance, software upgrades, collect data, or other operations, remotely. For instance, the administrator may desire to upgrade driver software for a networked printer for twenty computers that have access to that printer. The administrator may then select a bootable image of a software maintenance interface for updating drivers. A WOL extension is generated using the address of the bootable image for the maintenance application as well as a parameter indicating a location on a network drive that contains the new printer driver. Then the WOL extension is attached to a WOL packet and sent to each affected computer. Each affected computer then wakes up in response to the WOL packet, identifies the bootable image, and causes the BIOS to boot from the bootable image. Upon booting, the parameter identifies the new driver to the maintenance application.

Figure 5B:
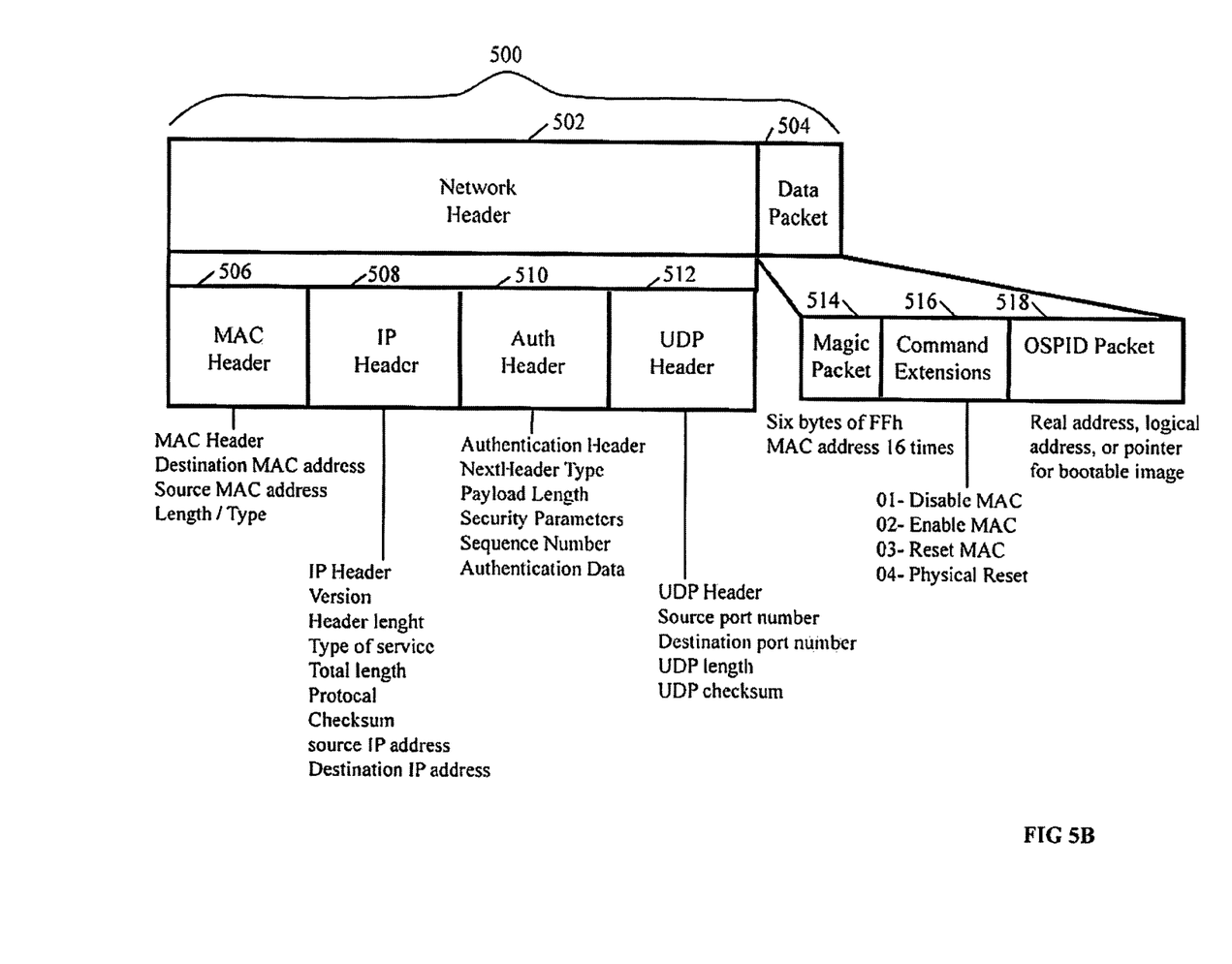
FIG. 5B depicts a diagrammatic representation of a network packet that is sent to a personal computer according to one embodiment.

As another example, a data packet like data packet 504 having an OSPID is depicted in FIG. 5B. In FIG. 5B, data packet 504 comprises a MAGIC PACKET™ frame 514, command extensions 516, and an OSPID packet 518. MAGIC PACKET™ 514 comprises the source address (server 102 MAC address), destination address (e.g., a client 104 MAC address or a multi-cast address for a broadcast MAGIC PACKET™), and a synchronization stream. The synchronization stream is typically six (6) bytes of FFh and is used to help client 104, particularly communication subsystem 94, recognize a frame as a MAGIC PACKET™ frame 514. A delineator such as six bytes of FFh is easy for hardware to detect and identifies the information as a MAGIC PACKET™ 514. In the embodiment depicted in FIG. 5B, the content of MAGIC PACKET™ 514 is a six bytes of "FF" followed by 16 copies of MAC addresses (with, for example, 8 copies of server MAC address and 8 copies of client MAC address) with no breaks or interruptions. In one alternative embodiment, there are 12 copies of MAC addresses, where 6 copies are client MAC addresses and 6 copies are server MAC addresses. The MAC addresses may be located anywhere within the data packet 504 but are preferably preceded by a synchronization stream. Client 104 will, in one embodiment, confirm that the MAGIC PACKET™ 104 contains the proper (and proper number of) synchronization stream, server MAC address, and client MAC address before initiating the power on process.

In an alternative embodiment, a broadcast MAGIC PACKET™ 514 may be used. In this embodiment, the MAGIC PACKET™ 514 may be received by all clients 104 on the network and the destination MAC address is listed as, for example, all ones (1's). This will indicate to client 104 that the MAGIC PACKET™ 514 is intended for it, even though the client MAC address is not included. In another embodiment, a multicast broadcast to a specified group of clients 104 may be utilized.

Data packet 504 also may include command extensions 516. Server 102 may specify one of a plurality of command extensions in data packet 504 in order to modify the network activity of client 104 in a particular way.

OSPID packet 518 may be a pointer to a selected bootable image. The pointer may include a real address for an application on a local or network drive, or a logical address recognized and translated by BIOS. In some embodiments, OSPID packet 518 includes a header to identify the packet as a pointer for a bootable image.

Figure 6:
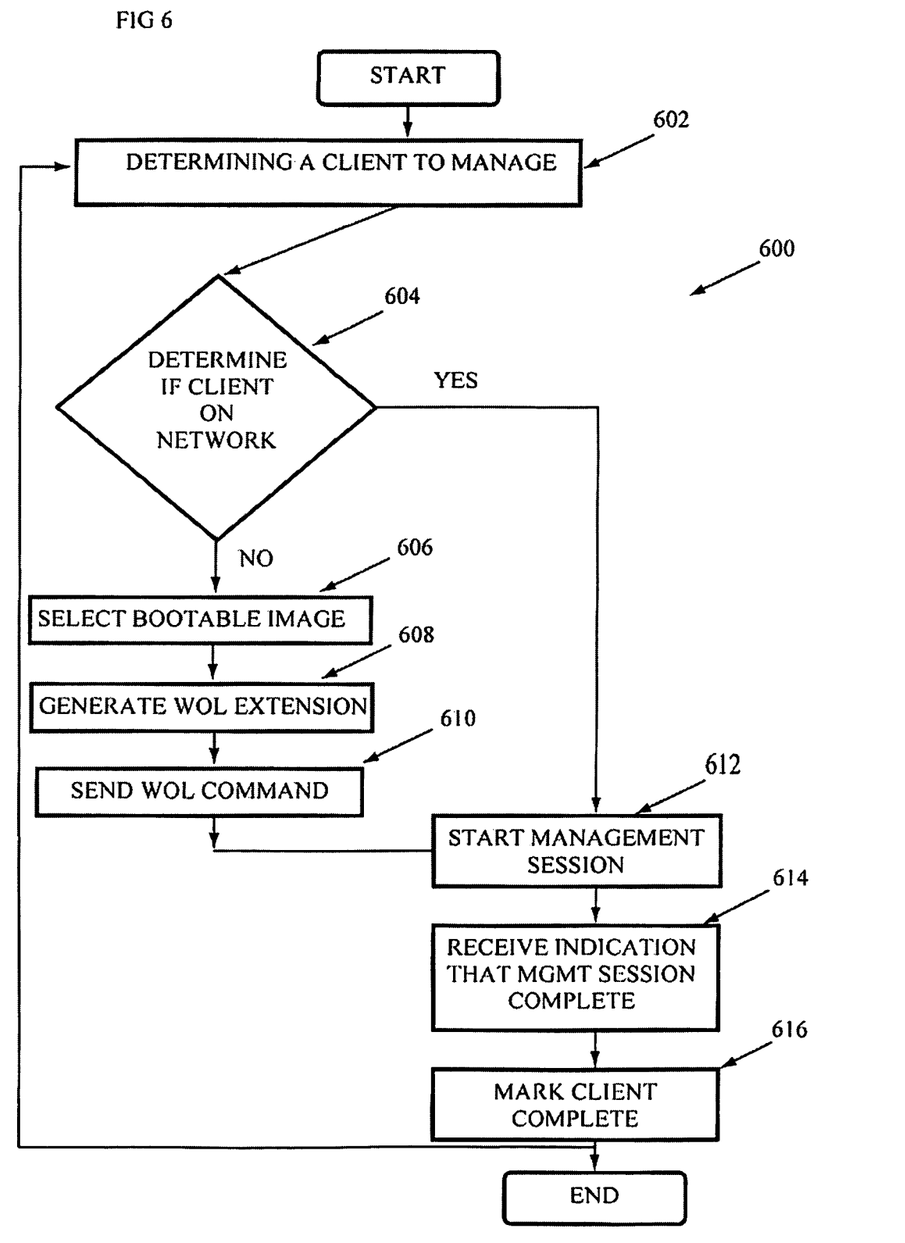
FIG. 6 depicts a flowchart for waking-up, selecting a bootable image for, and managing a client according to one embodiment.

When client 104 receives a network packet 500, it is received by physical layer and placed on the MII bus. When network packet 500 comprises a MAGIC PACKET™ 514 (as shown in FIG. 6), the MAC detects that it includes MAGIC PACKET™ 514, ignores any command extensions 516, and determines the presence of OSPID packet 518. When OSPID packet is present, the OSPID packet is stored in non-volatile memory accessible to POST. POST may then instruct the boot manager, or boot loader, to load the boot image indicated by OSPID packet 518.

In some embodiments, particularly legacy systems retrofitted to recognize the WOL extension 505, POST may insert an instruction for the boot manager in a keyboard buffer. In particular, the boot manager may expect to see changes in the bootable image from a user via a keyboard so POST may take advantage of that avenue of communication to instruct the boot manager to load the bootable image indicated by the OSPID packet 518. On the other hand, in new designs, the boot manager may include a service call to determine the presence of the OSPID packet 518.

In several embodiments, a usage indication may be stored with OSPID packet 518 to indicate to POST whether OSPID packet 518 should be used only once or whether OSPID packet 518 represents a more permanent change.

Referring now to FIG. 6, there is shown an example of a flow chart 600 for managing one or more clients, including selection of a bootable image for the one or more clients. In one embodiment, the method of flow chart 600 is performed on a server 102. Flow chart 600 begins with element 602, determining a client 104 to manage. In element 602, a client 104 may be chosen from a list of clients 104 via any methodology, such as by geographical location, time zone, user work schedules, type of computer, type of software, version of software loaded, need for updated software, specified desire for updated software, user-defined order, etc.

Managing a client 104 may include transmitting software, data, or updates to a client 104, receiving data or information from a client 104, requesting the client 104 to perform certain tasks or execute particular programs, etc. In one embodiment, managing a plurality of clients 104 is desired. To manage clients 104 efficiently, a server 102 may command, for example, that a new version of software be downloaded to clients 104 overnight so as to minimize any impact on users or the network during business hours. As another example, a server 102 may desire to access a database stored on a plurality of clients 104. As described herein, management of clients 104 may include any transmission, access or receipt of data or instructions between a client 104 and a server 102. A server 102 may handle a plurality of clients in any sort of order, such as by need, by geographical location, based on network loadings, based on the WOL status of the clients 104, by pre-defined group, importance, in groups or simultaneously, by random selection, etc.

After determining a client to manage, the function continues to decision block 604, determining if selected client 104 is on the network. Any method of determining if a client 104 is one the network may be used. If the client 104 is determined to be on the network, a management session for the client 104 is started in element 612. The management session may include downloading data or software to the client 104, causing certain programs to execute on the client 104, receiving data from the client 104, any interaction between the server 102 and client 104, etc. If the client 104 is determined (by, for example, the server 102) to not be on the network, the function continues to element 606, select a bootable image.

Selecting a bootable image may include selecting a maintenance or diagnostic application in, for instance, a PARTIES partition of a local hard drive of personal computer 12. The maintenance application may facilitate remote management involving, e.g., installation of new software on personal computer 12. Once the bootable image is selected, a WOL extension is generated in element 608. The WOL extension includes an OSPID to indicate that personal computer 12 is to boot from the bootable image. The indication may be an address for the bootable image or a representation of the bootable image that can be associated with the bootable image by personal computer 12.

The WOL extension is attached to a WOL packet and sent as a WOL command (element 610) to personal computer 12. As described previously in relation to FIGS. 5A and 5B, the WOL packet may be contained within a network packet, such as a data packet 504 and the WOL extension may be appended to the network packet, which is transmitted over a network to a client 104. In other embodiments, the OSPID may be integrated with the WOL packet.

As described previously, the WOL command will instruct the communication subsystem 94 to "wake" the client 104 so that a management session can be accomplished. After waiting an appropriate time (e.g., waiting for the system to boot up), the function continues to element 612, starting the management session for the client 104. After the management session is started, the function continues to optional element 614, receiving an indication that the management session is complete. An indication that a management session is complete may be useful in scheduling network activity, managing the current status of clients 104, etc. The management session is marked complete in element 616 and the function returns to element 602, where the next client 104 is determined, or the function terminates.

In another alternative embodiment, the WOL command is sent via a broadcast message. In this embodiment, particular clients 104 are not identified, and a special code or other indication may be used instead of client MAC addresses to indicate that the broadcast message is meant for a group of clients 104.

Figure 7:
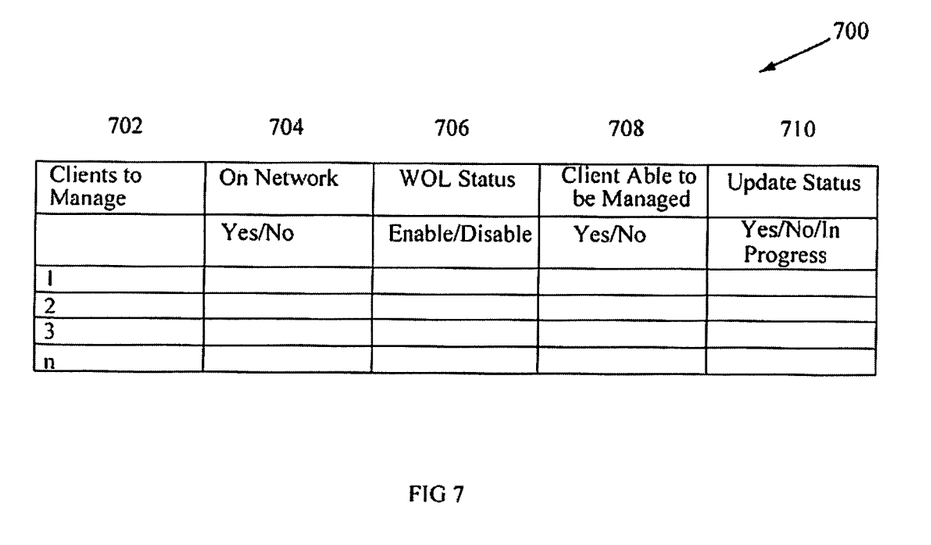
FIG. 7 depicts a table for managing a plurality of clients according to one embodiment.

FIG. 7 depicts a database table according to one embodiment. Table 700 may be used by a server 102 to manage clients 104 and may, in one embodiment, be located on a WOL database server 110 as shown in FIG. 1. In one embodiment, table 700 includes a client identification column 702, a network status column 704, a WOL status column 706, a client management column 708, and an update status column 710. Client identification column 702 may contain an identification associated with a particular client 104, such as a numerical identification, MAC code, network ID, etc. Network status column 704 may provide an indication of whether a client 104 is on the network (e.g., can be located and identified on the network). WOL status column 706 may contain an indication of whether WOL is either enabled or disabled for a particular client 104. Client management column 708 may contain an indication of whether the client 104 may be managed. This indication may be based on a determination of whether WOL is enabled, installed, or operational, or whether the client 104 itself is on the network or otherwise available, etc. Update status column 710 may include information about whether an update is needed, has already been started, has been completed, etc. Any of these tasks may be considered management sessions. In an alternative embodiment, update status column 710 may include any indication of an operation (of operations) to be performed on or related to a client 104. Any other type of database or organizational structure may be used in place of table 700.

Figure 8:
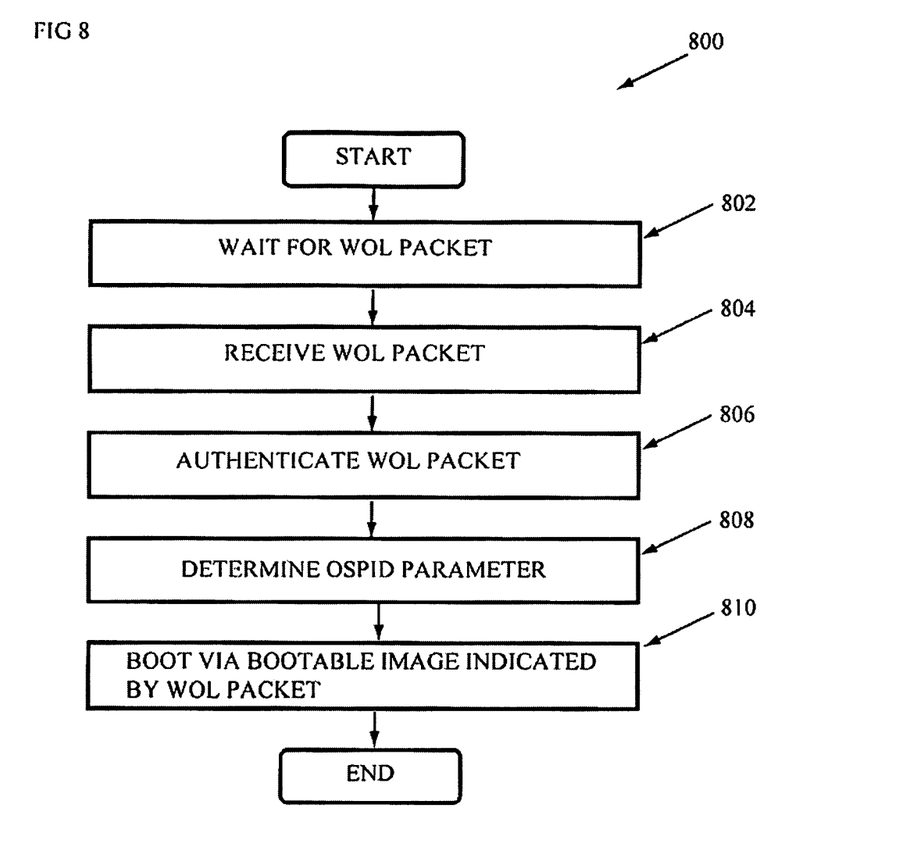
FIG. 8 depicts a flowchart for receiving and responding to a wake-on-LAN command having an OSPID according to one embodiment.

FIG. 8 depicts a flow chart for receiving and responding to a WOL packet having an OSPID according to one embodiment. In this embodiment, function 800 may be performed on a client 104 in communication with a server 102 performing function 600 of FIG. 6. Function 800 begins with element 802, waiting for WOL packet. In one embodiment, client 104 will be waiting in a low power state to receive the WOL packet. In element 804, client 104 receives the WOL packet from the server 102. The function continues in element 806, authenticating the WOL packet. Authenticating the WOL packet may be authenticated by a cryptographic method implemented to encrypt the WOL packet.

Upon authenticating the WOL packet, a packet parser may determine whether the packet includes an OSPID within the packet or as an extension (element 808). If an OSPID is identified, the OSPID is copied to non-volatile memory accessible by pre-boot logic such as POST. POST determines the presence of the OSPID at the non-volatile memory location and, in response, instructs the boot manager to load the alternative bootable image (element 810). The instructions from POST to the boot manager may, for instance, involve storing the instruction in a keyboard buffer to simulate entry of a command by a user via a keyboard. In some embodiments, the OSPID may also include a parameter to pass to the operating system resulting from the bootable image to instruct the operating system to perform a function such as to transmit data to server 102.

One embodiment of the invention is implemented as a program product for use with a computer system such as, for example, the system 101 shown in FIG. 1. The program product could be used on a server 102, on a client 104, or any combination thereof, or on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing one or more client computer systems, where one or more clients may be asleep. It is understood that the form of the invention shown and described in the detailed description and the drawings are to be taken merely as examples. It is intended that the following claims be interpreted broadly to embrace all the variations of the example embodiments disclosed.

What is claimed is:

1. A client computing device for booting via a bootable image, the client computing device comprising:
  a memory implemented in the client computing device and storing therein a plurality of bootable images, each bootable image having machine-executable instructions for booting the client computing device;
  a packet parser implemented on the client computing device to identify a partition identification associated with a bootable image in a wake-on-LAN packet to be received by the client computing device from a network, wherein the partition identification refers to a location of the bootable image within the memory of the client computing device, the bootable image to be one of the plurality of bootable images within the memory, wherein the partition identification associated with the bootable image in the wake-on-LAN packet specifies the location as a real or logical address pointer for the bootable image within a local resource of the client computing device;
  partition identification logic implemented on the client computing device and being coupled with the packet parser to store the partition identification in a memory location, the memory location to maintain the partition identification to instruct the boot manager to boot via the bootable image stored within the memory of the client computing device; and
  pre-boot logic implemented on the client computing device to implement an alternative boot sequence of booting from a default bootable image to boot from the bootable image at the location within the memory of the client computing device in response to the presence of the partition identification in the memory location, and to execute software to determine the trustworthiness of a software application on a maintenance server prior to executing the software application, the pre-boot logic to scan the memory location to determine the presence of the partition identification and to instruct a boot manager to boot via the bootable image in response to the presence of the partition identification.

2. The client computing device of claim 1, further comprising a packet authenticator to authenticate the wake-on-LAN packet.

3. The client computing device of claim 2, wherein the packet authenticator is designed to decrypt the wake-on-LAN packet with a private key.

4. The client computing device of claim 1, wherein the packet parser is configured to parse the wake-on-LAN packet to identify the partition identification.

5. The client computing device of claim 1, wherein the packet parser is configured to identify an extension attached to the wake-on-LAN packet as the partition identification.

6. The of claim 1, wherein the partition identification logic is configured to store the partition identification in non-volatile memory.

7. The client computing device of claim 1, wherein;
the partition identification associated with the bootable image in the wake-on-LAN packet constitutes an operating system partition identification of the bootable image; and
the pre-boot logic is to boot from the bootable image, wherein the operating system partition identification identifies the bootable image.

8. A method for booting a client computing device via a bootable image, the method comprising:
identifying, by the client computing device, a partition identification associated with the bootable image in a wake-on-LAN packet received by the client computing device from a network, wherein the partition identification refers to a location of the bootable image in a memory of the client computing device, the bootable image being one of a plurality of bootable images in the memory of the client computing device and further comprising machine-executable instructions for booting the client computing device, wherein the partition identification associated with the bootable image in the wake-on-LAN packet specifies the location as a real or logical address pointer for the bootable image within a local resource of the client computing device;
storing, by the client computing device, the partition identification in a memory location of the client computing device, the memory location to maintain the partition identification to instruct a boot manager of the client computing device to boot via the bootable image;
scanning, by the client computing device, the memory location to determine the presence of the partition identification; and
booting, by the client computing device, via the bootable image at the location within the memory of the client computing device, as an alternative boot sequence of booting from a default bootable image, in response to the presence, in the memory location, of the partition identification, and to execute software to determine the trustworthiness of a software application on a maintenance server prior to executing the software application.

9. The method of claim 8, further comprising authenticating the wake-on-LAN packet.

10. The method of claim 9, wherein authenticating the wake-on-LAN packet comprises decrypting the wake-on-LAN packet with a private key.

11. The method of claim 8, wherein identifying the partition identification comprises parsing the wake-on-LAN packet to identify the partition identification.

12. The method of claim 8, wherein identifying the partition identification comprises identifying an extension attached to the wake-on-LAN packet as the partition identification.

13. The method of claim 8, wherein booting comprises loading the bootable image from a PARTIES partition.

14. The method of claim 8, wherein booting comprises identifying a parameter associated with the partition identification as a post-boot instruction.

15. A computer program product for booting a client computing device, the computer program product comprising:
one or more computer-readable, tangible storage devices;
program instructions, stored on at least one of the one or more storage devices, to identify, by the client computing device, a partition identification associated with a bootable image in a wake-on-LAN packet received by the client computing device from a network, wherein the partition identification refers to a location within the client computing device of the bootable image, the bootable image being one of a plurality of bootable images stored in one of the one or more computer-readable, tangible storage devices of the client computing device and further comprising machine-executable instructions for booting the client computing device, wherein the partition identification associated with the bootable image in the wake-on-LAN packet specifies the location as a real or logical address pointer for the bootable image within a local resource of the client computing device;
store, by the client computing device, the partition identification in a memory location of the client computing device, the memory location to maintain the partition identification to instruct the boot manager to boot via the bootable image;
scanning, by the client computing device, the memory location of the client computing device to determine the presence of the partition identification; and
booting, by the client computing device, via the bootable image at the location of the bootable image within the one of the one or more computer-readable, tangible storage devices of the client computing device, as an alternative boot sequence of booting from a default bootable image in response to the presence, in the memory location, of the partition identification, and to execute software to determine the trustworthiness of a software application on a maintenance server prior to executing the software application.

16. The computer program product of claim 15, further comprising program instructions, stored on at least one of the one or more storage devices, to authenticate the wake-on-LAN packet.

17. The tangible, machine-accessible storage medium of claim 15, wherein the program instructions to boot load the bootable image from a hidden partition.

18. The client computing device of claim 15, wherein the partition identification associated with the bootable image in the wake-on-LAN packet contains a real or logical address of the bootable image.

* * * * *